United States Patent [19]
Reedy et al.

[11] 3,981,481
[45] Sept. 21, 1976

[54] BOTTOM OPERABLE TANK CAR VALVE

[75] Inventors: Charles E. Reedy, Bridgeton; Edwin S. Carlson, St. Charles, both of Mo.

[73] Assignee: ACF Industries, Incorporated, New York, N.Y.

[22] Filed: Oct. 8, 1974

[21] Appl. No.: 513,082

[52] U.S. Cl. .............................. 251/144; 251/291; 137/544; 137/797
[51] Int. Cl.² .......................................... F16K 1/48
[58] Field of Search .......... 251/144, 216, 218, 219, 251/220, 291; 137/797, 544

[56] References Cited
UNITED STATES PATENTS

| | | | |
|---|---|---|---|
| 1,523,484 | 1/1925 | Lindstrom | 251/219 X |
| 1,556,000 | 10/1925 | McBride | 251/144 X |
| 2,083,054 | 6/1937 | Cline | 137/797 |
| 2,092,926 | 9/1937 | Lithgow | 251/144 X |
| 2,567,426 | 9/1951 | Ferrari | 251/290 X |
| 2,696,083 | 12/1954 | Eddy | 137/797 X |
| 3,104,554 | 9/1963 | Mueller et al. | 137/797 X |
| 3,199,534 | 8/1965 | Shaw et al. | 251/144 X |
| 3,591,131 | 7/1971 | Carlson | 251/144 |
| 3,656,710 | 4/1972 | Shaw | 251/144 |

*Primary Examiner*—William R. Cline
*Attorney, Agent, or Firm*—Henry W. Cummings

[57] ABSTRACT

A bottom outlet for tanks is provided including a valve body welded to an opening in the bottom of the tank. The valve body has an opening into which a retainer assembly is fitted to urge a seal into engagement with at least a portion of the valve body. The retainer assembly includes a threaded center portion and a retainer vertical portion having an opening therein. A valve plug is mounted to be vertically movable between closed and open positions, into and out of engagement with the retainer vertical portion. A lower housing is affixed to the valve body with mechanical fasteners which define a first shear plane. The housing has an opening into which a valve operator assembly is mounted. The valve operator assembly includes a first valve operator having a lower tool connection and a first operator extension. The first operator extension has a first valve operator opening into which a second valve operator is inserted and is drivably engaged. The second valve operator includes a second shear plane and has threads which engage the threads in the threaded center portion of the retainer assembly. These threads may define the second shear plane. The second valve operator engages the valve plug, and moves the same between closed and open positions. A seal member is affixed to the valve plug or to the retainer vertical portion.

13 Claims, 18 Drawing Figures

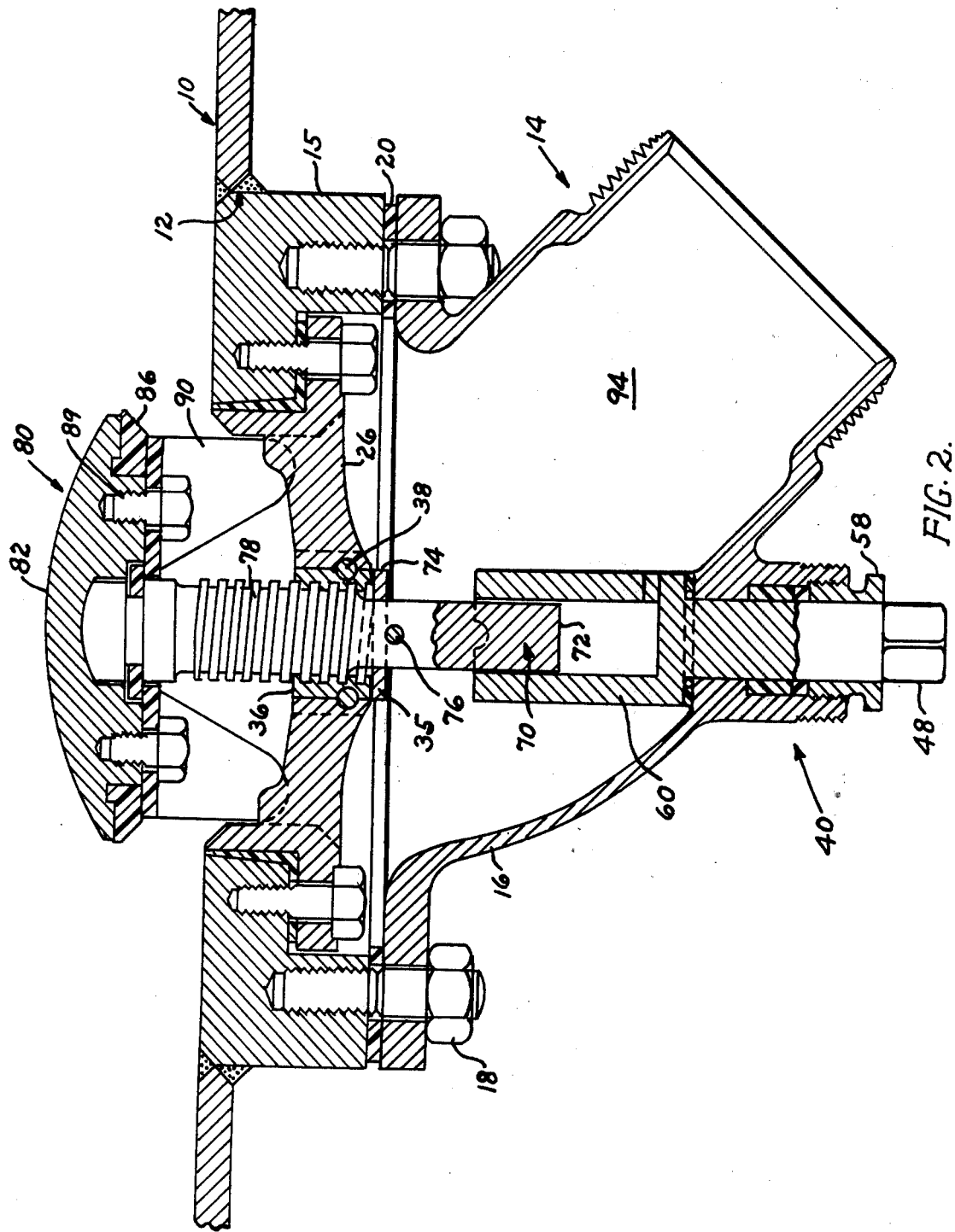

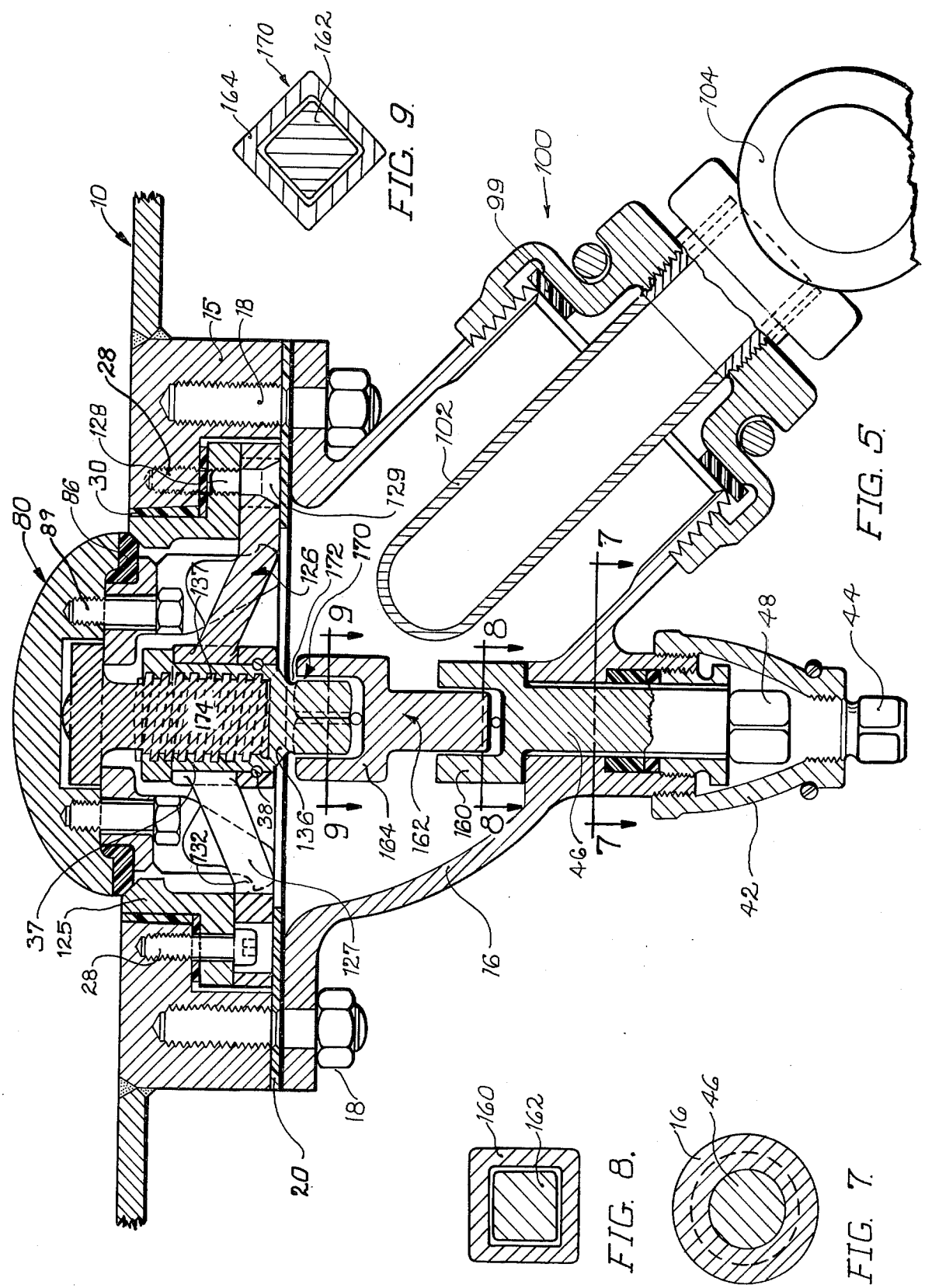

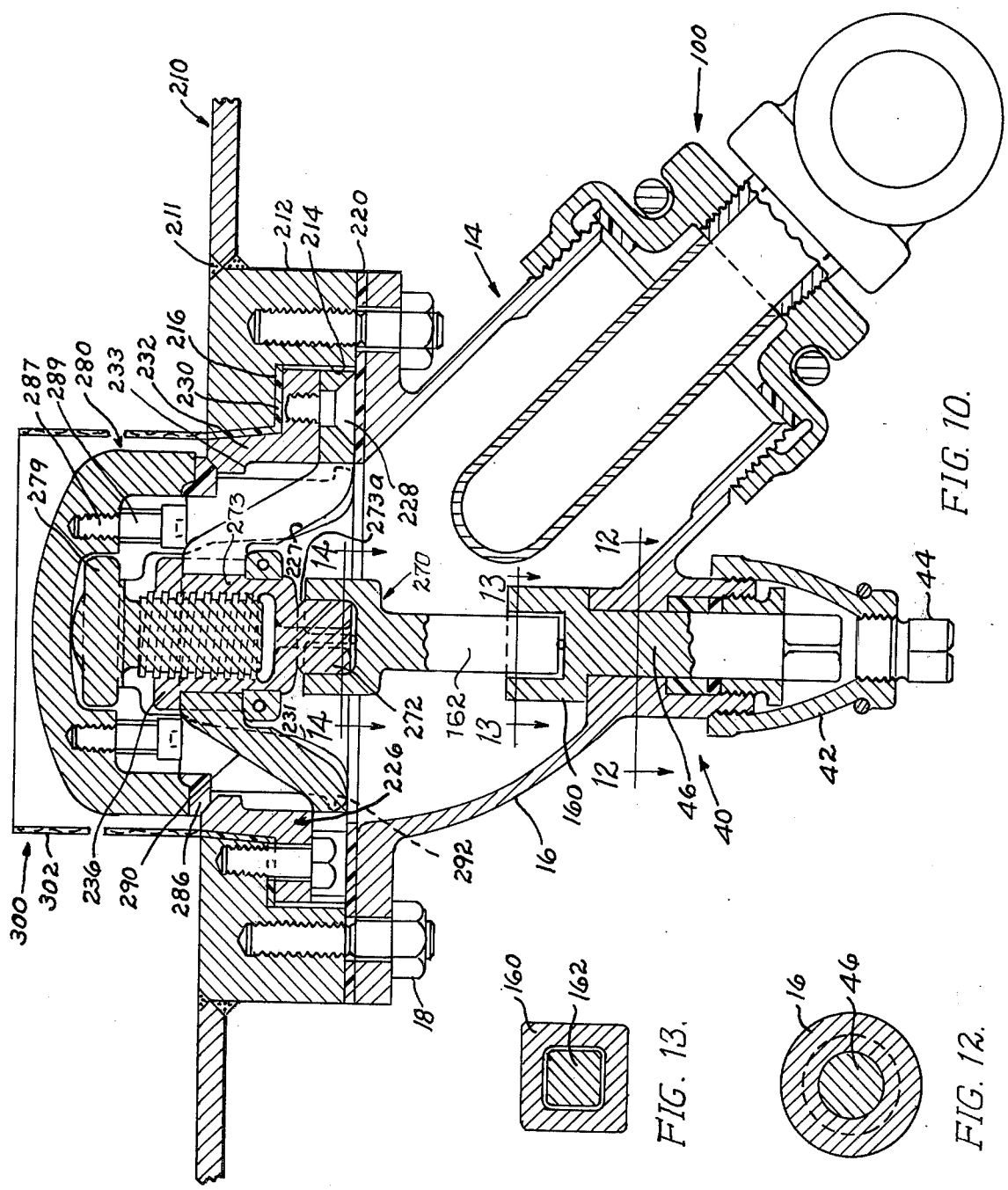

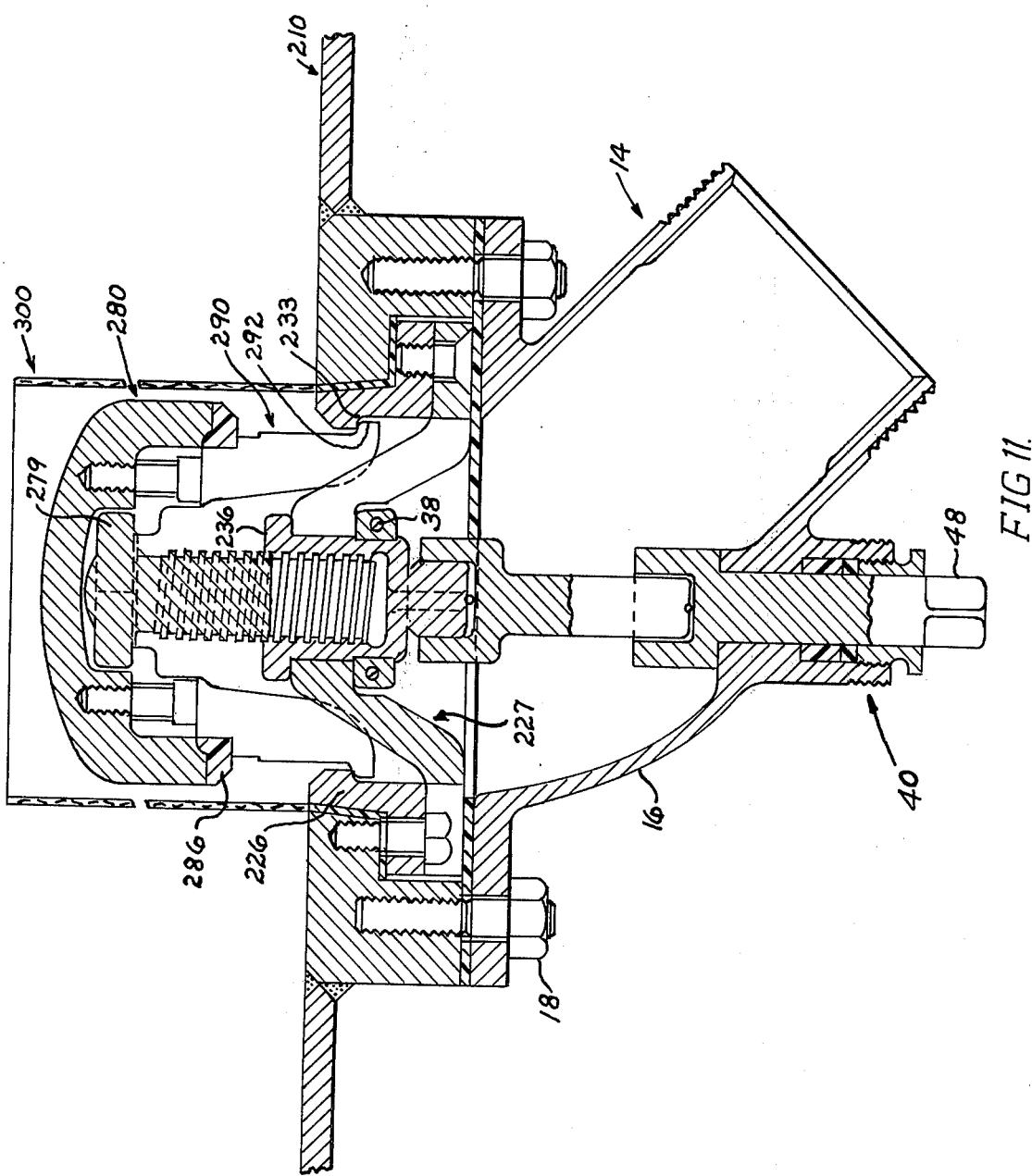

BOTTOM OPERABLE TANK CAR VALVE

BACKGROUND OF THE INVENTION

For the most part tank car valves have been operable from the top manhole of the tank. However, this is disadvantageous because if the valve is in some way defective or inoperative, or if the mechanism requires cleaning, an operator must do so from the inside of the car. The lading must be cleaned out of the car for this to take place. Time for the operator to remove the lading and clean the inside of the car is an expensive maintenance operation for the tank car owner or lessee. It is particularly important to be able to replace the entire valve plug operating mechanism while the tank contains lading and the plug portion of the valve remains in place.

Currently, the problem of derailments suggests that it would be preferable for the outlet mechanism to shear off rather than punch or tear a hole in the tank. Therefore it is desired that there be readily shearable planes in the valve which will shear off in the event of impact between the valve and the ground, or upon impact between the valve and articles in its path.

Furthermore, leakage is always a problem and it is desired to provide a valve design which will provide positive sealing to provide assurance against leakage.

One bottom outlet is disclosed in U.S. Pat. No. 1,565,913 (1925). In this patent a valve outlet assembly is riveted to the tank with rivets 16. A transverse operator 31 is utilized to move a valve member 24 into, and out of engagement with cylindrical threaded housing 18. A stop 32 is provided to stop the valve from opening further in the open position.

However, this valve could not be worked on unless the car were cleaned out. The operator would have to work on the valve from inside the car and the operating mechanism could not be replaced with lading in the tank. Furthermore, the necessary shear plates are not found in this valve.

Some ball valves have been provided on tank cars which are operable from the bottom exterior of the tank. See, for example, U.S. Pat. Nos. 3,227,101 (1966); 3,591,131 (1971) and 3,661,355 (1972). However, the operating mechanism for these ball valves could not be replaced with lading in the tank. Furthermore, these ball valves are quite expensive and it is desired to obtain a design which is less expensive than a ball valve.

Angle valves have also been utilized in tank cars. See, for example, pages 3, 5 and 7 of the catalog REGO, RAILROAD TANK CAR VALVES, 4201 West Peterson Avenue, Chicago, Ill. Copyright 1970 Rego Division of Golconda Corp. (copy attached). Angle valves utilizing a handwheel and a vertically extending threaded shaft cooperate with threads on the fixed housing to move the valve member between an open and closed positions. However, even if such an angle valve were reversed and used as an outlet valve (and there is no suggestion to do so) the operating mechanism of the valve could not be replaced with lading in the tank.

This same catalog on page 11 discloses a bottom operated discharge valve which is vertically movable within a strainer 4 and a housing 6 guides the vertical movement. A handle 20B is connected to an operating shaft 15B which is in turn connected to a cam lever arm assembly 16B which raises and lowers the valve. However, the operating mechanism for this valve could not be replaced with lading in the tank, and the shear planes are not provided.

In Melott U.S. Pat. No. 2,002,672 (1935) a valve member 32 is provided with a stop 83 to limit travel of the valve in open position.

In U.S. Pat. No. 2,072,271 (1937) a vertically movable safety valve utilizes guide members 32 to maintain basically vertical movement of the valve head B and prevent the same from being cocked during the vertical movement. However, this is a safety valve movable between open and closed positions against the bias of a spring by pressure from a pressure chamber. It has no operator in sense of an operator for a discharge valve, and thus this valve is not adapted to be used as a bottom discharge outlet.

SUMMARY OF THE INVENTION

It is an object of the present invention to provide a bottom discharge outlet for tanks in which the operating mechanism can be removed and/or replaced with lading in the tank.

It is another object of the present invention to provide a bottom discharge outlet having a shear plane whereby the lower portion of the outlet will shear off from the plug portion of the outlet, thereby avoiding breaking the tank and/or allowing the lading to escape.

It is another object of the present invention to provide a bottom discharge outlet in which lower portions of the valve operating mechanism can be replaced, leaving upper portions in place.

Another object of the present invention is to provide a bottom discharge outlet which has effective sealing to reduce or avoid lading leakage.

A bottom outlet for tanks is provided comprising a valve body adopted to be fixed to an opening in the bottom of the tank. The valve body has an opening therein into which a retainer assembly is fitted to urge a seal into engagement with at least a portion of the valve body. The opening may be so contoured as to define a shoulder which the seal and retainer assembly engage. The retainer assembly has a vertical portion defining an opening into which is fitted a valve plug which is movable between open and closed positions. The retainer assembly further has a threaded center portion. A housing is affixed to the valve body with mechanical fasteners which define a first shear plane. The housing is provided with an opening into which a valve operator assembly is mounted. The valve operator assembly includes a first valve operator having a lower tool connection and a first operator extension. The first operator extension is provided with a first valve operator opening into which a second valve operator is drivably engaged. The second valve operator is provided with threads which engage the threads in the threaded center portion of the retainer assembly. Means are provided on the second valve operator defining a second shear plane. The means on the second valve operator defining a second shear plane may be a portion of the threads which engage the threads in the retainer assembly. The second valve operator extends to the valve plug and moves the valve plug between opened and closed positions. A seal member is removably affixed to either the valve plug or the retainer vertical portion. Rotation of the first valve operator causes rotation of the second valve operator and movement thereof. The rotation and vertical movement of the second valve operator results in vertical movement of the valve plug between open and closed positions. The valve operator assembly can be disassembled from the bottom. The first and second shear planes insure that upon severe impacts to the outlet the housing and a portion of the valve operator assembly will shear off below the valve plug and thus tend to maintain the valve plug in closed position, and maintain any lading within the tank during and after impact.

THE DRAWINGS

FIG. 2 is a view similar to FIG. 1 illustrating the plug in the open position;

FIG. 5 is a sectional view of another embodiment of the bottom outlet of the present invention with the plug in the closed position;

FIG. 7 is a sectional view along the lines 7—7 in FIG. 5;

FIG. 8 is a sectional view along the lines 8—8 in FIG. 5;

FIG. 9 is a sectional view along the lines 9—9 in FIG. 5;

FIG. 10 is a sectional view of another embodiment of the bottom outlet of the present invention with the plug in closed position;

FIG. 11 is a sectional view of the bottom outlet shown in FIG. 10 with the plug in open position;

FIG. 12 is a sectional view along the lines 12—12 in FIG. 10;

FIG. 13 is a sectional view along the lines 13—13 in FIG. 10;

FIG. 14 is a sectional view along the lines 14—14 in FIG. 10;

Figure 17:
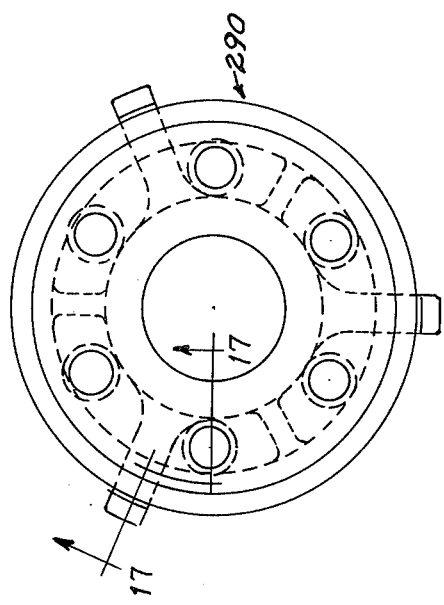
Figure 18:
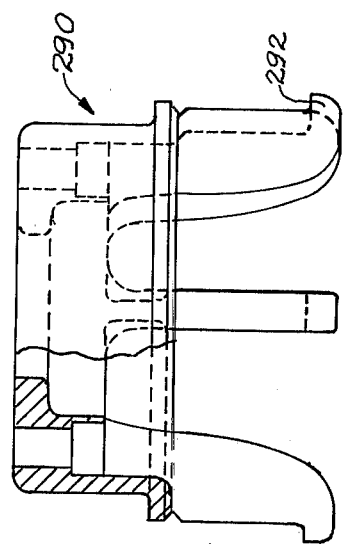
Figure 15:
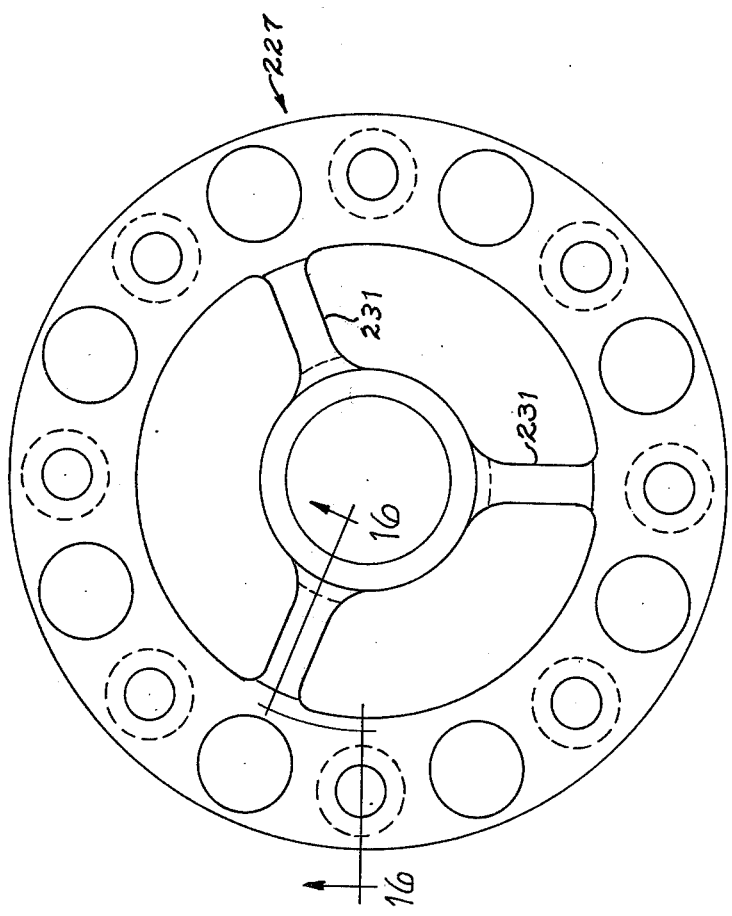
Figure 16:
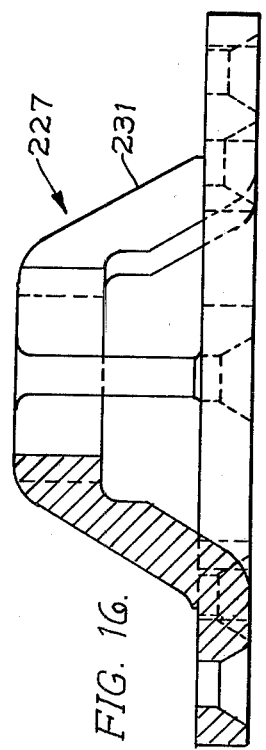

FIG. 15 and is a plan view of the spider or guide shown in FIGS. 10 and 11;

FIG. 16 is a view along lines 16—16 in FIG. 15;

FIG. 17 is a plan view of the valve guide shown in FIGS. 10 and 11;

FIG. 18 is a view along lines 18—18 in FIG. 17;

DETAILED DESCRIPTION OF THE INVENTION

In accordance with one embodiment of the present invention, as shown in FIGS. 1–4, a tank car indicated generally at 10 has a bottom discharge opening therein 12. A bottom discharge outlet indicated generally at 14 is integrally mounted within opening 12, for example by welding. The outlet 14 comprises a valve body 15. A housing 16 is removably mounted upon valve body 15 by means of fastening bolts 18. A seal member 20 is provided therebetween.

Valve body 15 has an inner opening indicated at 22, and a transverse shoulder 24. A retainer assembly 26 comprising a spider 27 is held in place against shoulder 24 by means of fastening bolts 28. A seal member 30 is provided therebetween. Spider 27 has a vertically extending portion 32 which extends into the smaller diameter opening 33 of valve body 15. Spider 27 has a centrally disposed opening therein 34. A stem nut 36 is provided in this opening and is held in place by retainer pins 38. Alternately a single U-shaped member may be used instead of pins 38. If desired, the threads could be provided directly in spider 27.

A valve operator assembly indicated generally at 40 is removably affixed to housing 16. This operating assembly may comprise a closure cap 42 which threadedly engages housing 16. An outlet valve cap 44 may be provided which threadedly engages closure cap 42. A vertically extending first operator 46 is provided with a tool connection portion 48 adapted to be engaged by a wrench or appropriate tool to rotate operator 46.

Housing 16 is provided with an opening 50 which preferably is of reduced diameter as indicated at 52 and enlarged diameter as indicated at 54. A seal or packing 56 may be provided in the enlarged portion 54 which is held in place by a packing gland nut 58 which threadedly engages housing 16 at 59.

Figures 1, 3, 4:
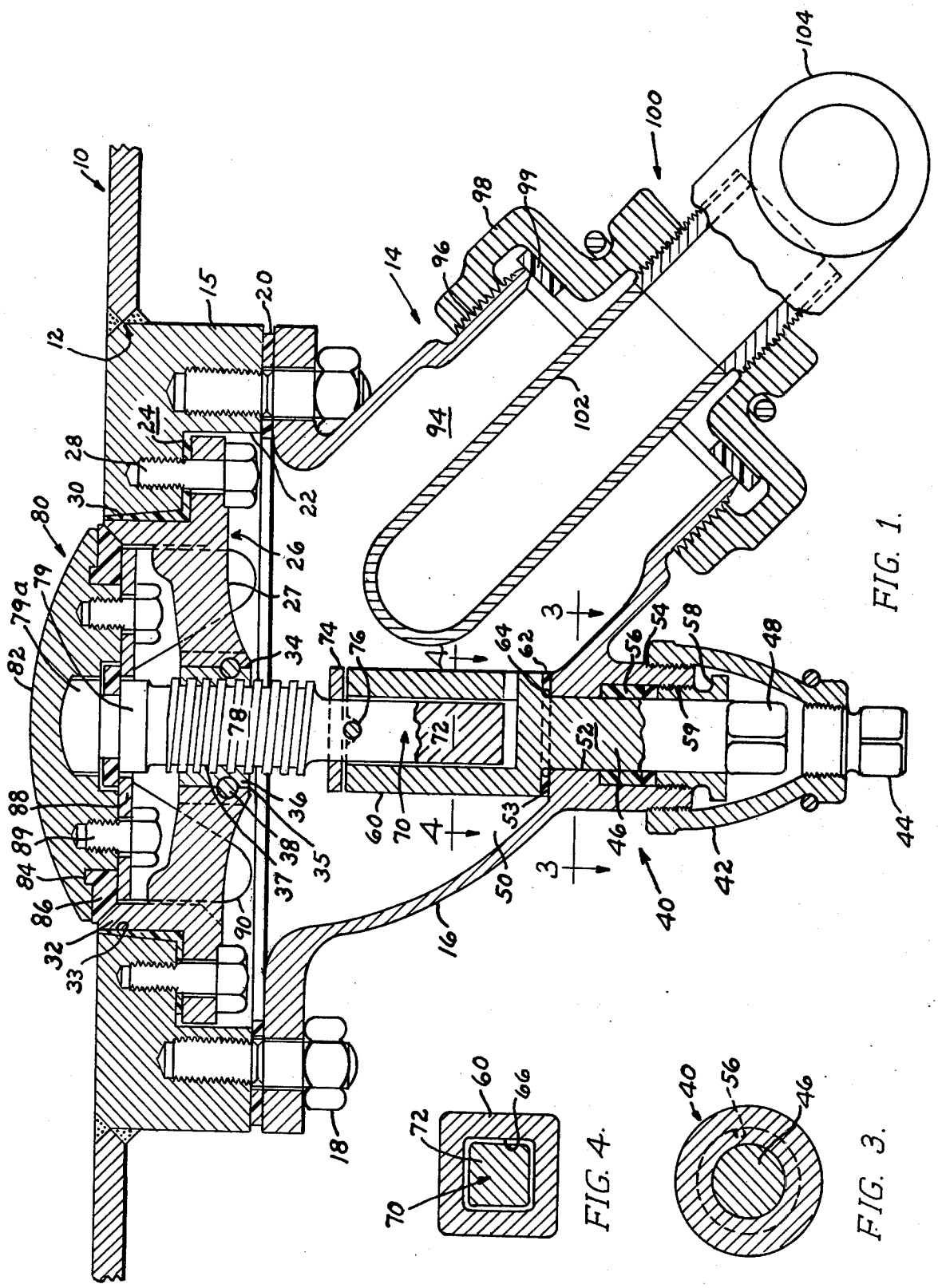
FIG. 1 is a sectional view of one embodiment of the bottom discharge outlet of the present invention with the plug in the closed position.
FIG. 3 is a sectional view along the lines 3—3 in FIG. 1.
FIG. 4 is a sectional view along the lines 4—4 in FIG. 1.

First operator 46 is preferably circular as shown in FIG. 3 for rotation within housing 16 and is provided with a rectangular or a square first extension 60 as shown in FIG. 4. Extension 60 sits upon a shoulder 53 defined by housing 16. A thrust washer 62, for example, made of halogenated polyethylene, such as tetrafluoroethylene, is provided on shoulder 53 and a conventional O-ring seal 64 is also provided. Extension 60 is provided with a hollow portion or opening 66 into which a second valve operator indicated generally at 70 is inserted. Second operator 70 comprises a portion 72 which is rectangular or square and adapted to be engaged by first extension 60. A stop washer 74 held in place by a stop pin 76 is provided on the valve operator above portion 72.

Second valve operator 70 is threaded as indicated at 78 and threads 78 are adapted to engage cooperating threads 37 provided upon the retainer assembly (stem nut 36). Operator 70 is provided with a shoulder 79 and a head 79a adapted to engage a valve plug indicated generally at 80. Valve plug 80 may comprise a plug member 82 generally hemispherical having openings therein 84 into which are affixed a valve seat seal 86. Seal 86 is held in place by a gasket retainer plate 88 which has mounted integral therewith either by welding or appropriate fasteners valve guides 90. Seal member 86 positively engages the vertical extension of 32 of spider 27 upon rotation of operator 70 by operator 46 to insure a good seal in the closed position.

Housing 16 is provided with a second opening 94 and a threaded portion 96. An outlet cap 98 threadedly engages threads 96 and holds in place an outlet cap gasket 99. Means for heating lading which may have congealed in the valve outlet is indicated generally at 100 and may comprise a tubular member 102 having conduit structure attached thereto 104 for circulating a heating fluid, such as steam, for melting any congealed lading in the outlet assembly. In some applications it might be desired to cool the outlet, in which case cooling fluid may be passed through conduit structure 104 and tubular member 102.

In the operation of the apparatus shown in FIGS. 1–4, closure cap 42 is first removed allowing operation of the wrenching portion 48 by the operator. Rotation of wrenching portion 48 rotates extension 60 which in turn rotates operator 70 moving the same upwardly by means of threads 78 engaging threads 37 of the retainer assembly. Valve guides 90 insure that valve plug 80 will rise in a generally vertical manner and will not tend to become cocked or misaligned in the vertical movement. The fully opened position is achieved when stop washer 74 engages the lower surface 35 of the retainer assembly (stem nut 36) as shown in FIG. 2.

Prior to the removal of closure cap 98 a heating fluid may be passed through conduit 102 to melt any congealed lading in this portion of the outlet assembly. Then cap 98 is removed as shown in FIG. 2 and the lading discharged through opening 94.

It will be apparent that the valve arrangement of the present invention has considerable flexibility. Removal of bolts 18 allows removal of the housing 16, and everything except valve operator 70, retainer assembly 26 and valve plug 80 with lading in the tank. Removal of bolts 28 will allow removal of the entire remaining assembly, but this would not usually be done with lading in the tank.

Thus the problem associated with prior outlets of the operator having to remove the outlet from inside the car after the car has been emptied and cleaned is avoided by the arrangement of the present invention. Thus a considerable saving in labor and in tank downtime is achieved. Operator assembly up to and including first operator 46 and first operator extension 60 can be replaced with lading in the tank.

Another important advantage of the outlet of the present invention is the assembly provides for a shear plane in the event the outlet is impacted by derailment and/or hitting something in its path. One set of shear grooves is provided in threads 78 and another through seal 20 in bolts 18. Thus, if for example, the car is derailed and the outlet hits the ground it will readily shear off, leaving the valve plug 80 closed and it is unlikely that the lading will escape.

Figure 6:
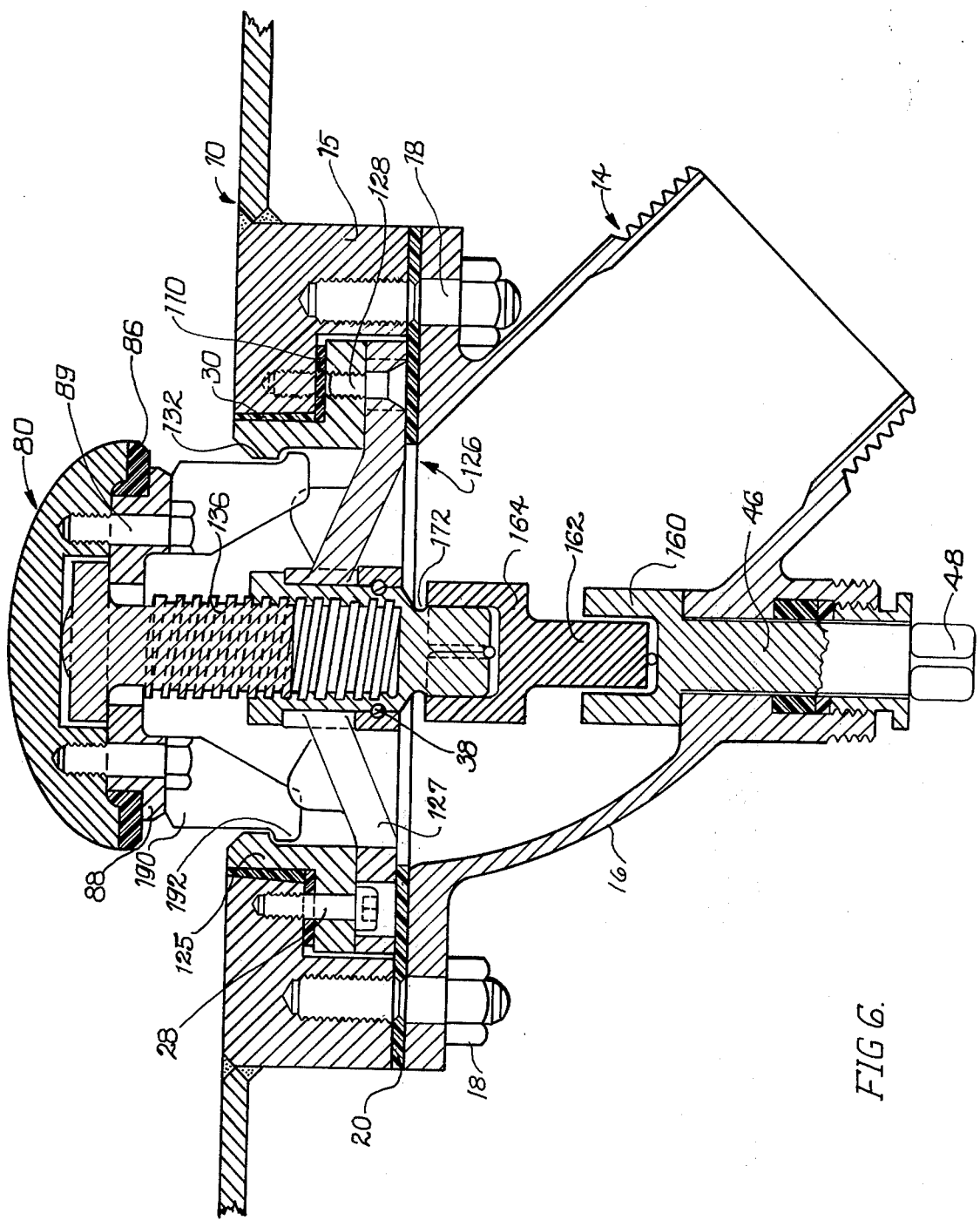
FIG. 6 is a view similar to FIG. 5 of another embodiment of the present invention illustrating the plug in the open position.

Other embodiments of the present invention are shown in FIGS. 5 and 6. The structure is similar to that shown in FIGS. 1 and 2.

Retainer assembly 126 may comprise a separate spider 127 and guide 125. Fasteners 128 having a countersunk head 129 may be used to hold spider 127 and guide 125 in place. Fasteners, such as cap screws 28, hold the retainer assembly 126 and seal 30 within valve body 15.

Operator 46 is provided with an operating stem extension 160 which engages an intermediate operator 162 of rectangular or square cross section which has an expanded portion 164 having a square or rectangular cross section which engages a cooperating portion 172 of an upper operator indicated generally at 170. Threads 174 of operator 170 engage threads 137 in depending operator 136 and thus move valve plug 80 to the open position shown in FIG. 6.

A shear groove is provided in the upper operator at 172 and in fasteners 18 at seal 20.

Guide 125 in retainer assembly 126 is provided with a generally transverse catch 132 adapted to engage a protrusion 192 provided upon the plug guides 190 when the full open position is achieved (FIG. 6). Fasteners 89 hold in place guide retainer plate 88, seal 86, depending operator 136 and depending guides 190.

Housing 16 and operating assembly up to and including intermediate operator 162 may be removed and/or replaced with lading in the tank. Furthermore, spider 126 may also be removed with lading in the tank by removal of bolts 128 and pins or cap screws 38, and sliding the spider downwardly.

Valve guide 125, valve plug 80, depending operator 136 and gasket 86 remain in place. By removal of bolts 28 the remaining pieces 80, 86, and 125 may be removed, after the lading has been unloaded. The valve plug assembly can be disassembled by removing fasteners 89.

Furthermore, shear grooves 20 along bolts 18 are maintained and a shear groove is provided at 172 in operator 170. Thus protection against impact is provided in the embodiments shown in FIGS. 5 and 6.

Another embodiment of the present invention is shown in FIGS. 10-18. In this embodiment the upper valve operator and valve plug are mounted within the tank and valve body. Thus these members do not depend downwardly as far and are not as readily sheared off in the event of derailment or impact with articles in its path. In this embodiment the tank 210 is provided with an opening 211 into which is affixed by welding a valve body 212. This valve body is provided with a vertical opening 214 and a horizontal shoulder 216. Countersunk bolts 228 hold a seal member 230 between shoulder 216 and a retainer assembly 226 comprising a spider 227 and a guide 232 having a transverse latch or catch 233. Spider 227 is provided with a plurality of ribs 231 which hold in place an upper operator 270. Operator 270 is provided with a driven portion 272 and a threaded body portion 273 which threadably engages a depending member 279 from a valve plug 280. Upper operator 270 is driven by a lower operator 46 and an intermediate operator 162.

Fasteners 289 hold in place guide 290 which in turn holds in place a seal member 286 adapted to engage guide 232 of retainer assembly 226. In the open position the protrusions 292 on guides 290 engage catches 233 to limit travel of the valve body in the full open position.

Clearance is provided between seal 230 and guide 232 and a means for preventing foreign objects from contacting the valve assembly is provided therebetween indicated generally at 300. This may comprise a suitable screen 302 which extends above the height of valve plug 280 in the completely open position.

It will thus be apparent that upper valve operator 270 is located within the valve body and the tank. A shear groove is provided along seal 220 and at 273a in upper operator 270. Thus in the event of impact and/or derailment the valve operator assembly below driven portion 272 will be sheared off.

Furthermore, the screen means 300 prevents foreign material or foreign objects which may have been left in the tank from coming in contact with the valve operative elements and harming the operation thereof.

It is thus apparent that this embodiment is preferred insofar as the safety under impact or derailment is concerned and insofar as protection from objects in the tank are concerned.

What is claimed is:
1. A bottom outlet comprising:
   a valve body adapted to be integrally affixed to an opening in the bottom of a tank;
   said valve body having a valve body opening defining a shoulder; a retainer assembly fitting within said valve body opening and urging a seal into engagement with at least a portion of said shoulder;
   said retainer assembly having a threaded center portion and a vertical extension having a retainer opening therein; a seal and a housing affixed to said valve body with mechanical fasteners comprising a shear plane;
   said housing having a housing opening therein; a valve operator assembly mounted within said hous- ing opening comprising a first valve operator having a lower tool connection
and a first operator extension;
said first operator extension having a first valve operator opening therein in which a second valve operator is drivably engaged;
said second valve operator having threaded means comprising a second shear plane and adapted to engage said threaded center portion;
said second valve operator further having means for engaging a valve plug adapted to close said retainer opening;
a seal member removably affixed to said valve plug whereby rotation of said first valve operator causes rotation of said second valve operator and vertical movement thereof, and whereby rotation and vertical movement of said second valve operator results in vertical movement of said valve plug from the closed to an open position, and whereby said valve operator assembly can be completely disassembled from the bottom; and whereby said first and second shear planes insure that upon severe impacts to said outlet, said housing and said valve operator assembly will shear off below said valve plug, thereby tending to maintain said valve plug in the closed position and maintain any lading within the tank during and after such impact.

2. A bottom outlet according to claim 1 wherein said shoulder is defined by a horizontal portion and a vertical portion of said valve body.

3. A bottom outlet according to claim 1 wherein means are provided in said outlet for preventing solid objects inside the tank from contacting said valve plug.

4. A bottom outlet according to claim 1 wherein means are provided for limiting the travel of said plug in open position.

5. A bottom outlet according to claim 1 wherein means are provided in said housing for temperature control of lading found in said housing.

6. A bottom outlet according to claim 1 wherein a cap is provided adapted to be integrally affixed to said housing surrounding said first operator.

7. A bottom outlet according to claim 1 wherein said retainer assembly comprises a spider having threaded means centrally thereof and wherein said second valve operator threads engage the threaded means on said spider.

8. A bottom outlet according to claim 7 wherein said retainer assembly comprises a stem nut which is threaded and wherein said second valve operator engages the threaded portion of said stem nut.

9. A bottom outlet according to claim 8 wherein mechanical fasteners maintain said retainer assembly in engagement with said valve body.

10. A bottom outlet according to claim 1 wherein stop means are provided on said second operator to limit travel of said plug in the open position.

11. A bottom outlet comprising:
a valve body adapted to be integrally affixed to an opening in the bottom of a tank;
said valve body having a valve body opening therein;
a retainer assembly fitting within said valve body opening; and urging a seal into engagement with at least a portion of said valve body;
said retainer assembly having a threaded center portion and a retainer vertical portion having a retainer opening therein; a housing affixed to said valve body with mechanical fasteners comprising a first shear plane;
said housing having a housing opening therein into which a valve operator assembly is operatively mounted comprising a first valve operator having a lower tool connection and a first operator extension;
said first operator extension having a first valve operator opening therein in which a second valve operator is drivably engaged;
said second valve operator having threaded means adapted to engage said threaded center portion, and means defining a second shear plane;
said second valve operator further having means for engaging a valve plug adapted to close said retainer opening; a sealing member removably affixed to one of said valve plug and retainer vertical portion;
whereby rotation of said first valve operator causes rotation of said second valve operator and vertical movement thereof, and whereby rotation and vertical movement of said second valve operator results in vertical movement of said valve plug from the closed to an open position, and whereby said valve operator assembly can be disassembled from the bottom;
and whereby said first and second shear planes insure that upon severe impacts to said outlet, said housing and a portion of said valve operator assembly will shear off below said valve plug, thereby tending to maintain said valve plug in the closed position and maintain any lading within the tank during and after such impact.

12. A bottom outlet according to claim 11 wherein a seal is provided between said housing and said valve body.

13. A bottom outlet according to claim 11 wherein means are provided in said outlet for preventing solid objects inside the tank from contacting said valve plug.

* * * * *